United States Patent [19]

Patterson

[11] Patent Number: 4,662,161

[45] Date of Patent: May 5, 1987

[54] PULL-TYPE WINDROWER

[75] Inventor: Roger L. Patterson, Selkirk, Canada

[73] Assignee: MacDon Industries Ltd., Manitoba, Canada

[21] Appl. No.: 784,942

[22] Filed: Oct. 7, 1985

Related U.S. Application Data

[63] Continuation of Ser. No. 630,635, Jun. 13, 1984, Pat. No. 4,573,309.

[51] Int. Cl.[4] .............................................. A01B 73/00
[52] U.S. Cl. ...................................... 56/228; 56/15.4; 172/314; 280/412; 280/411 A
[58] Field of Search ...................... 56/14.9, 15.4, 15.6, 56/218, 617, DIG. 14; 172/314; 280/411, 412, 413

[56] References Cited

U.S. PATENT DOCUMENTS

| | | | |
|---|---|---|---|
| 2,525,917 | 10/1950 | Leighnor | 56/DIG. 14 |
| 3,522,849 | 8/1970 | Sweet | 172/314 |
| 4,213,628 | 7/1980 | Hardesty | 280/412 |
| 4,346,909 | 8/1982 | Handeby | 172/314 |

FOREIGN PATENT DOCUMENTS

131466  8/1919  United Kingdom ................ 172/314

*Primary Examiner*—Gene Mancene
*Assistant Examiner*—John G. Weiss
*Attorney, Agent, or Firm*—Adrian D. Battison; Stanley G. Ade

[57] ABSTRACT

A pull type swather or windrower which can be used either singly or in a duplex or tandem arrangement can be adjusted from a working position to a transport position by pivoting the hitch through 90° and by unlocking the wheels so they turn through 90° to move the swather at right angles to its working direction. The swather is mounted on two wheels inwardly of the ends of the swather and rearwardly of the drapers with the wheel remote from the hitch movable to a position forwardly of its working position so as to lie under the drapers and to balance the center of gravity so that the swather can be supported solely by the two wheels in the transport position. A rear or duplex swather can be attached to the front swather by a duplex hitch which provides steering movements of the rear swather in a direction opposite to the steering movements of the front swather so that the former properly tracks the latter in echelon relationship. The steering movements are obtained by a spring biassing the rear swather in one direction and a flexible linkage arrangement which controls the amount of movement of the rear swather. The intermediate hitch can be latched to the front swather to take up a transport position.

10 Claims, 13 Drawing Figures

PULL-TYPE WINDROWER

BACKGROUND OF THE INVENTION

This application is a continuation application of United States application Ser. No. 630,635 filed on June 13, 1984 now U.S. Pat. No. 4,573,309.

This invention relates to a pull-type farm implement generally of the swather or windrower type and is particularly applicable for use in swathers which can be used in duplex, that is one swather can be pulled in echelon relationship relative to the first.

In recent years there has been growing pressure particularly from the farmers in the large grain growing areas to increase the size and working width of farm implements so as to reduce the number of passages across the land by the tractor or implement. This has been of particular importance in swathers and attempts have been made to couple swathers together for use in tandem or in duplex where one moves across the land forwardly and to one side of the second under motive power from the same tractor.

This has caused a number of problems in that firstly, such tandem or duplex arrangements are very difficult to transport from one working location to another. Secondly, the actual coupling between the swathers has been unable to produce a sufficiently manoeuverable machine to allow effective commercial use.

The first problem is not wholly applicable to duplex swathers in that, in all cases, the swather must be transportable by road or highway from one working location to another and normally this is achieved by pivoting or moving the hitch and turning or moving the wheels so that the tractor tows the swather at right angles to its normal working direction. Various proposals for the move ment of the hitch and for the movement of the wheels to achieve this position have been made, but none have been fully satisfactory from the opposing viewpoints of simplicity and cheapness of manufacture on the one hand and the stability of the towed swather on the other hand.

SUMMARY OF THE INVENTION

It is one object of the invention to provide a coupling between a first swather and a second swather or other farm implement of this type arranged in echelon which provides a very manoeuverable machine while moving in the working direction and a machine which can be readily transferred into the transport position.

According to a second aspect of the invention therefore, there is provided a duplex pull-type farm implement arrangement comprising a first implement and a second implement, hitch means for communicating driving force from the first implement to the second implement such that the second implement follows the first in echelon relationship in a working direction and means for pivotally coupling the hitch means to both the first implement and the second implement.

It is one advantage of the first aspect of the invention that the two wheels which normally are in the working position, sit inward of the ends of the frame and behind the drapers and can be used to provide a stable support for the swather when moving in the transport direction without the addition of wheels necessary only in the transport position. Thus, in one embodiment only, two wheels are necessary on the swather. In a second embodiment used as a trailing or duplex swather, a third wheel is used to support the hitch, but effectively the swather is supported again under the two rear wheels.

The second aspect of the invention enables the second or duplex swather to be steered relative to the first. This can be achieved by detecting changes in angle between the hitch means and the first swather and in dependence upon these changes, steering the second swather so as to change the angle between it and the hitch means. This, in accordance with an advantageous embodiment, is achieved by biassing the second swather in one direction and then pulling it back in the other direction in accordance with movement of a linkage attached between the hitch means and the rear of the first swather.

In addition, the pivotally mounted hitch means allows the hitch to turn relative to both swathers so that both swathers can be converted into the transport position quickly and easily and the hitch means latched to the front swather so as to prevent pivotal movement in the transport mode.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Turning firstly to FIGS. 1 through 7 which show the hitch and supporting wheel arrangements of a single swather, the construction of the swather will not be described in detail since it is of a conventional arrangement, except to state that the swather comprises a frame 20 which is substantially rigidly supported from a main support beam 21 of generally circular cross section. The frame in turn supports a blade schematically indicated at 22 and a pair of drapers 23 which, in conventional manner, transport the cut crop inwardly toward a centre opening 24 through which it is deposited to form a swath behind the swather indicated in FIG. 2 at 25.

Figure 4:
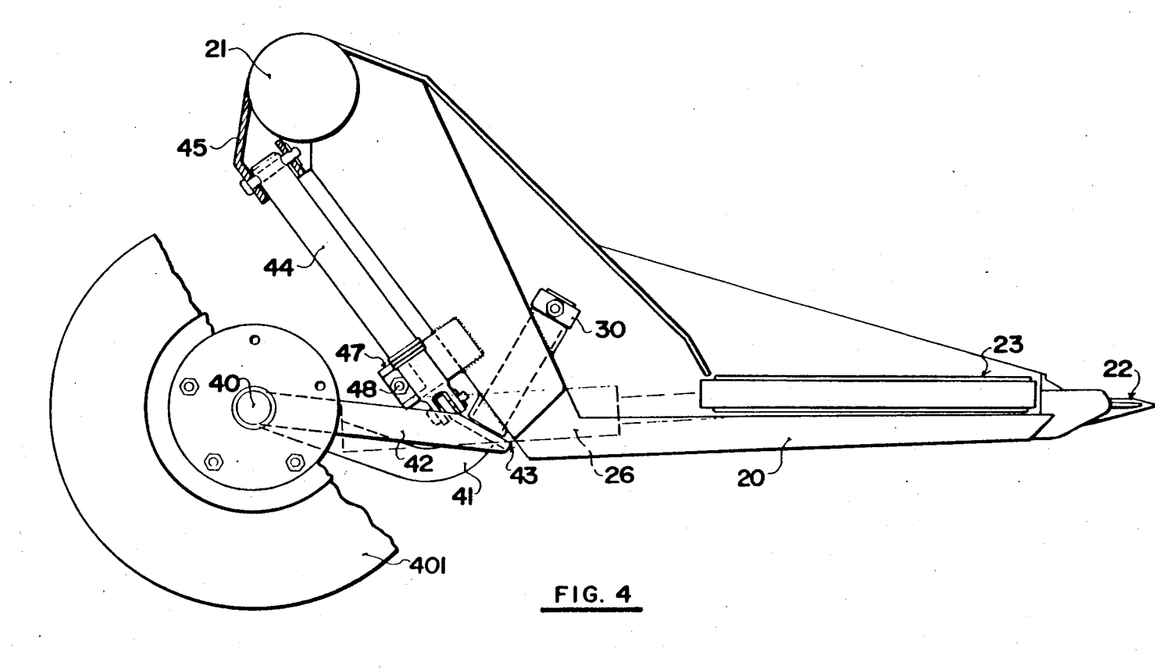
FIG. 4 is an elevational view of the right hand wheel in the field position.
Figure 6:
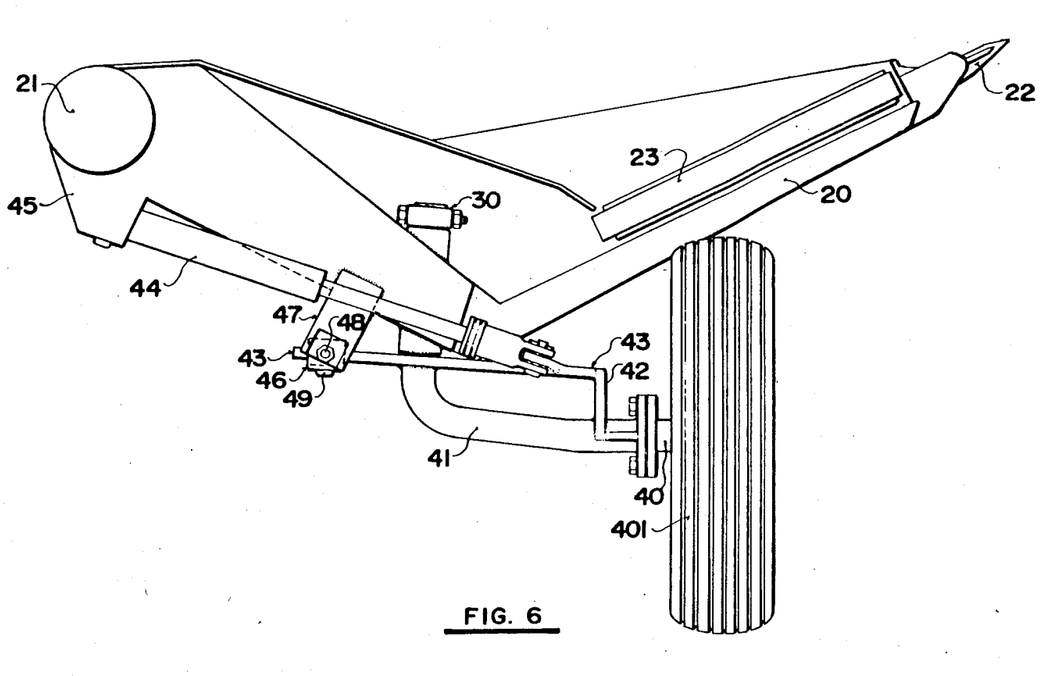
FIG. 6 is an elevational view similar to that of FIG. 4 showing the right hand wheel in the transport position.

As shown again schematically in FIGS. 4 and 6, the drapers 23 are positioned rearwardly from the blade 22. The frame 20 is pivotally mounted relative to the main support beam 21 and can be raised and lowered by a piston and cylinder arrangement 26 to adjust the height of the blade 22 relative to the main support beam 21 and therefore relative to the ground. The frame may also be supported relative to the support beam 21 by a spring (not shown) to allow the blade and frame to lift from the ground when the blade contacts a rigid object and to return to the ground to continue cutting the crop after the object.

The frame terminates in a transverse forward bar 27 which is coupled to the remainder of the frame in a manner which need not be described in detail. The bar 27 is coupled to the rear of a tractor by a hitch generally indicated at 10. The hitch includes two rearwardly extending hitch arms 11 and 12 coupled at a common hitch point 13 to the rear of the tractor. The hitch arms 11 and 12 diverge at a shallow angle. The rear end of each of the hitch arms 11 and 12 is connected to a transverse bar 14 by pivotal couplings 15 and 16 respectively. The transverse bar 14 is in turn coupled to the front apex of a triangular hitch frame comprising struts 17, 18 with a further strut 19 acting to locate the position of the transverse bar 14 relative to the struts 17, 18.

Figures 2, 2A:
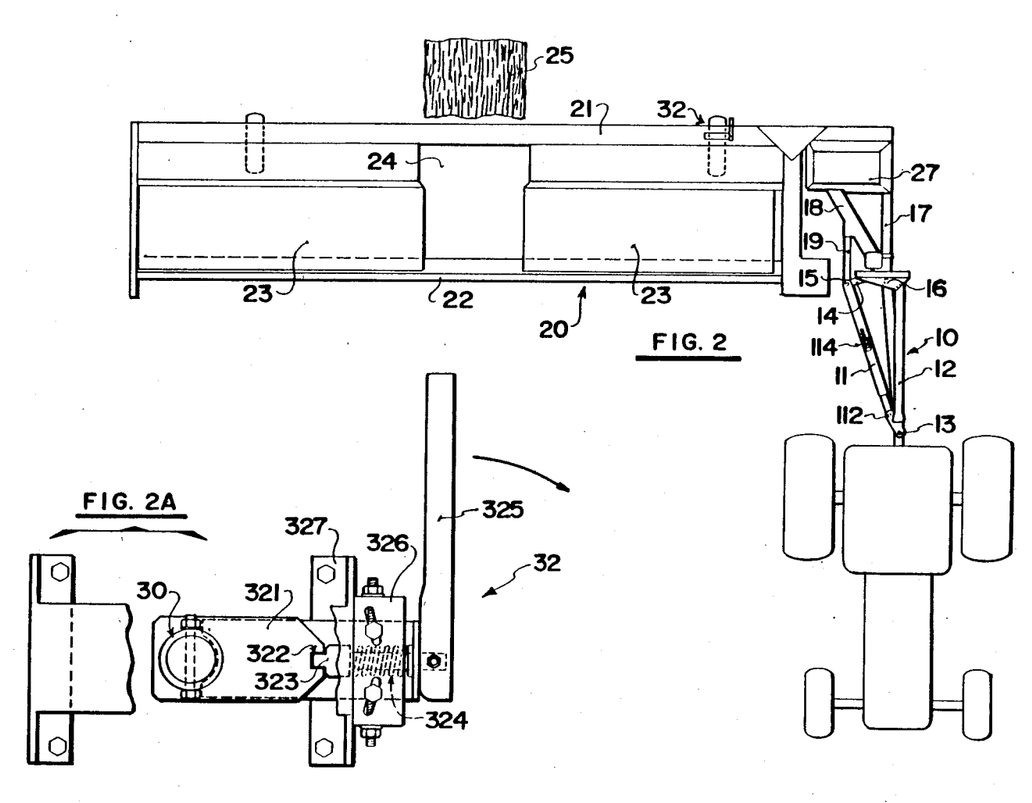
FIG. 2 is a view similar to that of FIG. 1 showing the swather in the field or working position.
FIG. 2A is a plan view of the locking mechanism of the left-hand wheel in the locked position and in the field position of FIG. 2.

As shown in FIG. 2, in the working position, the hitch lies substantially parallel to the working direction and substantially directly behind the tractor with the transverse bar 14 at right angles to the working direction.

Figure 1:
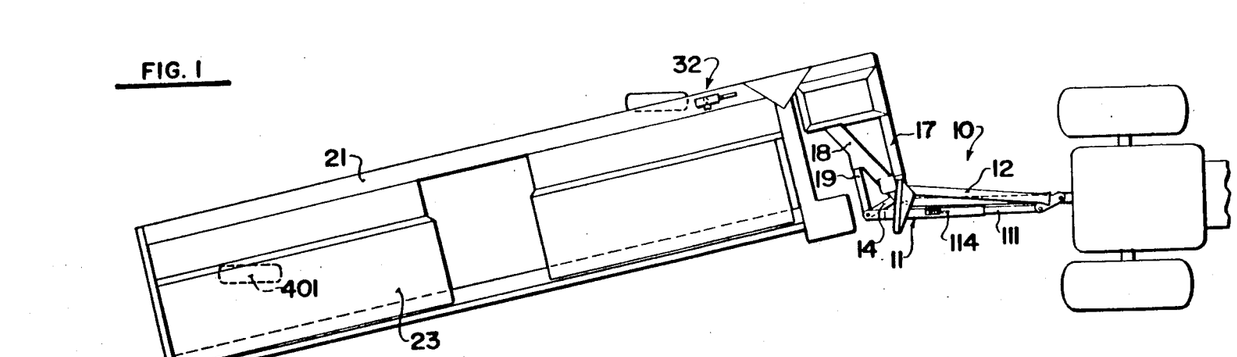
FIG. 1 is a schematic plan view of a single pull-type swather attached to a tractor and positioned in the transport mode.

In order to move the hitch 10 into the transport position shown in FIG. 1, the hitch arm 11 is telescopically extendable so that both the arms 11 and 12 pivot about the pins 15, 16 on the transverse bar 14 and are then locked into position by the locking of the arm 11 in the extended position. The arm 11 is shown in more detail in FIG. 7. The arm comprises an outer rectangular sleeve member 110 and an inner sliding member 111 which can fit within the sleeve 110 for sliding movement between a retracted and an extended position. The front end of the sleeve member 110 includes a pair of hitch lugs 112 for coupling to the hitch arm 12 to allow the pivotal movement necessary to accommodate the reduction in the angle between the arms 11 and 12 in movement from the field position to the transport position.

Figure 7:
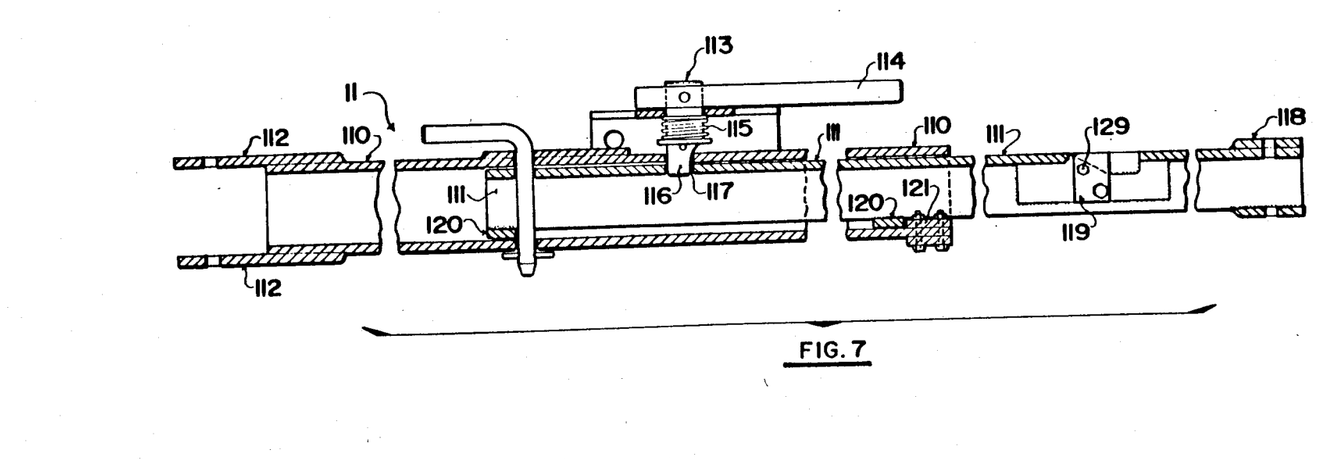
FIG. 7 is a cross sectional view of the telescoping hitch arm 11 of FIG. 1.

The sleeve 110 carries a latch mechanism 113 including a handle 114 which can be pivoted upwardly against the force of a spring 115 to retract pin 116 from an opening through the sleeve member through which the pin 116 projects. The pin 116 has a flat 117 on one side.

The inner sliding member 111 also includes a pair of hitch lugs 118 at the rear end for attachment to the transverse bar 14. The telescoping hitch is locked in the field position by engagement of the pin 116 with a block 119 positioned in an opening in the upper face of the inner portion 111. The block 119 may be bolted to the side of the portion 111 so that the bolts 129 will break under an excessive load. The handle 114 is turned to position the flat 117 of the pin 116 against the block 119. In order to move to the transport position, the handle 114 is used to raise the pin 116 and rotate through 180°. In that position, it bears on top of block 119 and allows the inner member to be extended and locked in the transport position shown in FIG. 7. In order to control the sliding movement, plates 120 are provided on the bottom of the inner member 111 and a stop plate 121 is positioned at the end of the sleeve 110 to prevent the inner member 111 from sliding completely out of the sleeve 110.

Turning now to the details of the supporting wheels, both wheels are mounted on horizontal axles for rotation about the axle with the axle in turn mounted for pivotal movement about a substantially vertical axis so the axle can be moved to move the wheel with the wheels in the transport position shown in FIG. 1 and in the field position shown in FIG. 2. The pivotal movement about the substantially vertical axis can be used to allow a castor movement about a castor sleeve 30 (FIGS. 4 and 2A).

The castor sleeve 30 for the left hand wheel is positioned substantially directly beneath the tubular main support beam 21 and the sleeve for the right hand wheel is positioned forwardly of the beam 21 on a beam 210 supported by the main beam 21.

The left hand wheel includes a locking mechanism which is shown in schematic form in FIGS. 1 and 2 and in enlarged detail in FIG. 2A. This includes a plate 321 attached to the castor sleeve 30 which includes a notch 322 at one part of its periphery for cooperation with a pin 323 which is biased forwardly into the notch by a spring 324. A handle 325 is attached to the pin 323 and cooperates with a housing 326 so that when pivoted through 90° to extend directly outwardly, the handle 325 draws the pin 323 out of contact with the notch 322. The position of engagement where the handle lies at right angles to the pin is shown in FIGS. 2 and 2A and in this position, the pin 323 locks the plate 321 against rotational movement thus preventing rotational movement of the axle about the substantially vertical pivot axis and locks the wheel in the field position.

Steering adjustment of the left hand wheel can be obtained by moving the housing 326 relative to a support plate 327 to adjust the angle of the pin 323 relative to the sleeve 30.

When the handle 325 is operated to release the plate 321, the left hand wheel is free to castor to take up the transport direction as shown in FIG. 1.

Figure 5:
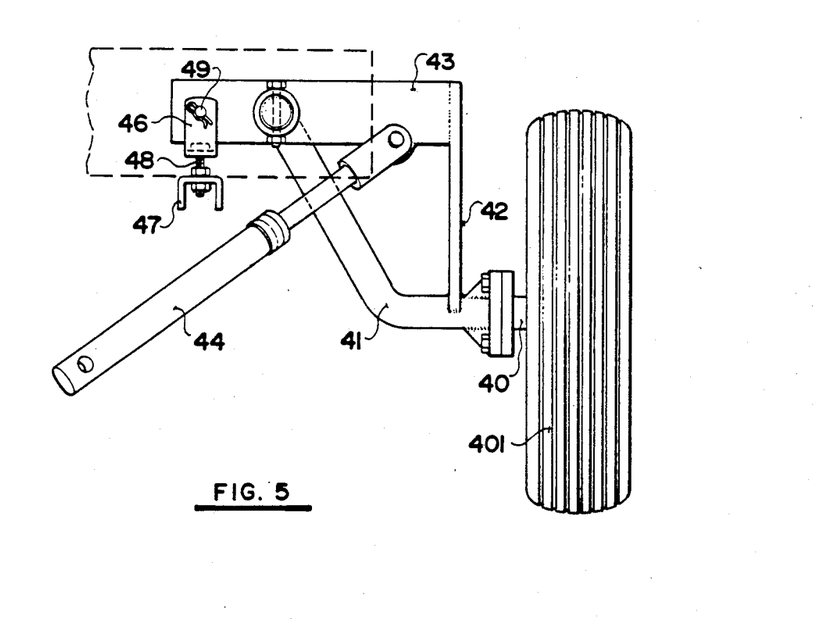
FIG. 5 is a plan view similar to that of FIG. 3 showing the right hand wheel in the transport position.

The right hand wheel is shown in more detail in FIGS. 3 through 6 and in this case instead of the axle 40 supporting the wheel 41 being directly coupled beneath the sleeve 30 for castoring action around the sleeve 30, the axle 40 in this case is offset relative to the sleeve 30 so that rotation of the axle about the axis of the sleeve 30 causes a movement of the wheel transversely to the position shown in FIGS. 1 and 5. In this regard, the axle 40 is supported upon a lever mechanism comprising a first support bar 41 and a second support bar 42 both of which are coupled to a plate 43 which pivots about the axis of the sleeve 30 and lies in a plane substantially at right angles to the axis. The movement of the plate 43 about the sleeve 30 is controlled by a piston/cylinder 44 which is mounted at one end by a coupling 45 to the main support beam 21 and at the other end, through a loose coupling to the plate 43.

Figure 3:
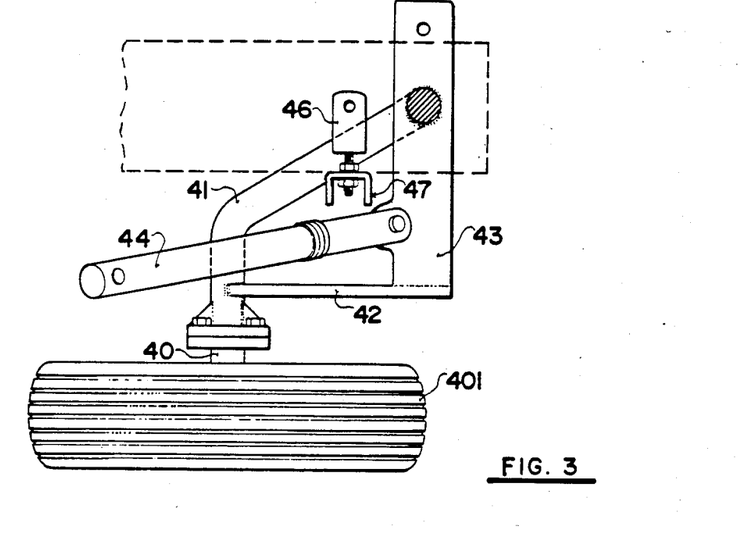
FIG. 3 is a plan view of a detail of FIG. 2 showing the right hand wheel in field position.

In a field position of the right hand wheel shown in FIGS. 3 and 4, the right hand wheel is free to castor and hence turns in a clockwise direction as shown in FIG. 3 until the collar 441 on the piston rod 442 contacts the end 443 of the cylinder. In this position the frame is substantially completely supported by the left hand wheel and the right hand wheel, both of which remain effectively stationary in the working direction and both of which are arranged inboard of the ends of the frame and substantially rearwardly of the drapers 23.

When it is intended to move into the transport position, the left hand wheel is unlocked by operation of the handle 325 and the piston 44 is operated to rotate the right hand wheel about the vertical axis to move it into the forward position beneath the draper shown in FIGS. 1, 5 and 6. In order to accommodate this movement, the drapers 23, blade 22 and frame are raised relative to the main support beam 21 by the piston/cylinder 26. As opposed to conventional swathers of this type, the lifting of the frame is arranged to provide sufficient movement to accomodate the movement of the wheel 401 into the transport position shown.

The right hand wheel 401 is then locked into the transport position by locking of the plate 43 in the rotated position shown in FIG. 5 by a lug 46 which is coupled to a frame member 47 by an adjustable bolt arrangement 48. A lock pin 49 can simply be removably positioned to co-operate with openings in the plate 43 and the lug 46 to retain the plate 43 in a locked position controlled by the adjustment of the bolt 48.

The adjustment of the bolt 48 controls the angle of the wheel 401 relative to the rear of the frame in the transport position thus controlling the angle of the frame as it moves in the transport direction. In the transport position, the front wheel or left hand wheel is free to castor so as to accommodate steering movements of the frame while the rear or right hand wheel follows the movement of the tractor. The front and rear wheels are spaced either side of the centre of gravity of the frame and either side of the line running directly backwardly from the tractor through the frame so as to provide a stable support for the frame as it moves in the transport direction.

Turning now to FIGS. 8 through 11, there is shown a duplex swather arrangement in which both of the swathers include the wheel mounting arrangement previously described and the front swather includes a hitch 10 as previously described. The front swather is generally indicated at 50 and the second swather is generally indicated at 51 with the swathers being substantially of the same construction except that the rear swather 51 is modified to incorporate a supporting front wheel 52. The front wheel is mounted upon a frame member 53 and is attached thereto by a castoring mechanism of conventional arrangement.

The frame of the rear swather 51 is attached to the frame member 53 by a lever mechanism generally indicated at 54 which allows the front of the rear swather to be raised and lowered in a similar manner to that previously described in relation to the piston/cylinder 26.

Thus there is provided a cylinder/piston 541 and a spring 542 which control the height of the blade and drapers.

Figure 8:
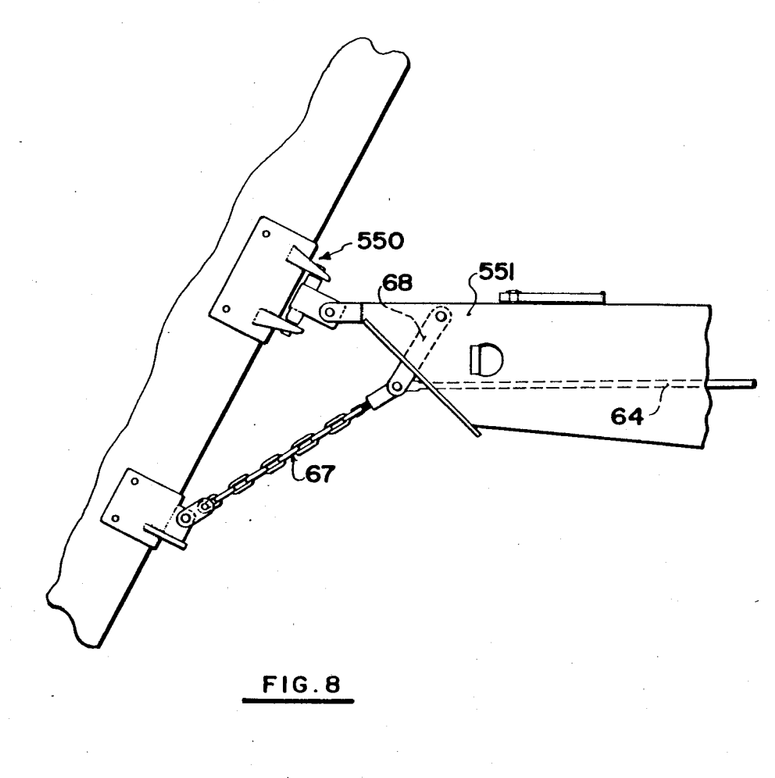
FIGS. 8 and 8A together form a plan view of a hitch for coupling a second swather to the rear of the first in a tandem or duplex arrangement.
Figure 8A:
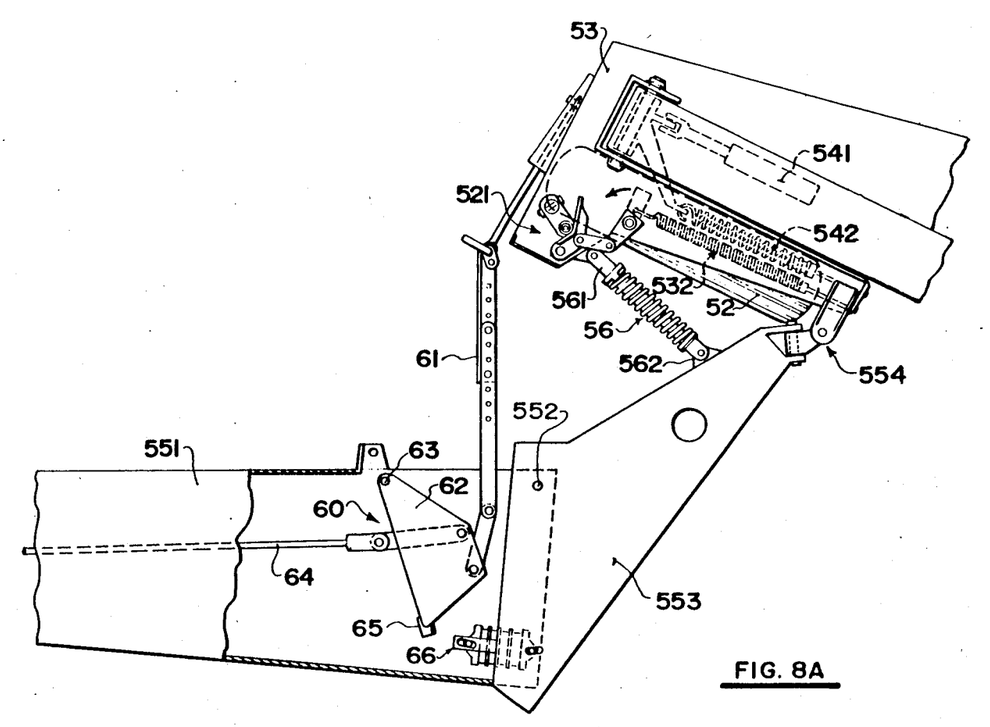

The front and rear swathers 50, 51 are coupled by a duplex hitch arrangement generally indicated at 55 which is shown in more detail in FIGS. 8 and 8A. The hitch communicates pulling force from a bracket 550 attached to the front swather which provides a two directional pivotal coupling relative to a substantially triangular frame section 551. The frame section 551 is formed of a box section and is connected by bolts 552 to a further substantially triangular section 553 which extends rearwardly and to one side of the section 551. The section 553 is coupled to the frame member 53 by a pivotal coupling 554 which allows pivotal movement about both a horizontal axis to accommodate changes in height between the front and rear swathers and also about a vertical axis to accommodate steering movements of the rear swather relative to the hitch 55.

The hitch 55 therefore provides a rigid linkage for communicating pulling forces from the front swather to the rear swather but is pivotally coupled to both the front swather and the rear swather to allow relative movement therebetween in a steering and height adjustment direction.

The face of the hitch section 553 adjacent the frame member 53 is inclined outwardly and rearwardly and the cooperating face of the frame member 53 is inclined inwardly and rearwardly so as to provide faces which are substantially parallel. A strong compression spring 56 is coupled between the faces on respective lugs 561, 562 so as to bias the frame member 53 to move or pivot in a clockwise direction relative to the pivot 554. Thus, the front of the rear swather is biased to a steering movement toward the right. This bias is also applied to the wheel 52 by a spring and linkage 532. This steering movement is constrained by a linkage which passes through the interior of the hitch 55, the linkage indicated generally at 60.

The linkage 60 includes a first tension bar 61 attached to the frame member 53 forwardly of the spring 56. The tension bar is coupled to a pivot plate 62 at one corner thereof with the pivot plate 62 pivoted inside the hitch member 551 on a pin 63. A rod 64 running substantially along the length of the hitch section 551 is coupled to a third corner of the plate 62 with the fourth corner including a stop 65 for engaging a spring mounted stop plate 66 to prevent excessive movement of the plate 62. The rod 64 is, in turn, coupled to a chain 67 attached to the rear of the front swather at a position spaced from the coupling 550. The movement of the rod 64 is controlled by a bar 68 so that it can move backwards and forwards along the length of the section 551 to control the movement of the plate 62 and thence the tension bar 61.

The length of the chain 67 is chosen or adjusted such that with the front swather moving straight forward in the working direction behind the tractor, the hitch 55 extends rearwardly and sidewardly relative to the front swather to attach to the rear swather at the front left hand corner thereof whereby the rear swather follows the front swather in echelon arrangement.

The chain thus is taut in this position so that it holds the tension bar 61 to prevent the spring 56 from biassing the rear swather to steer to the right so the rear swather follows in the working direction.

Figure 9:
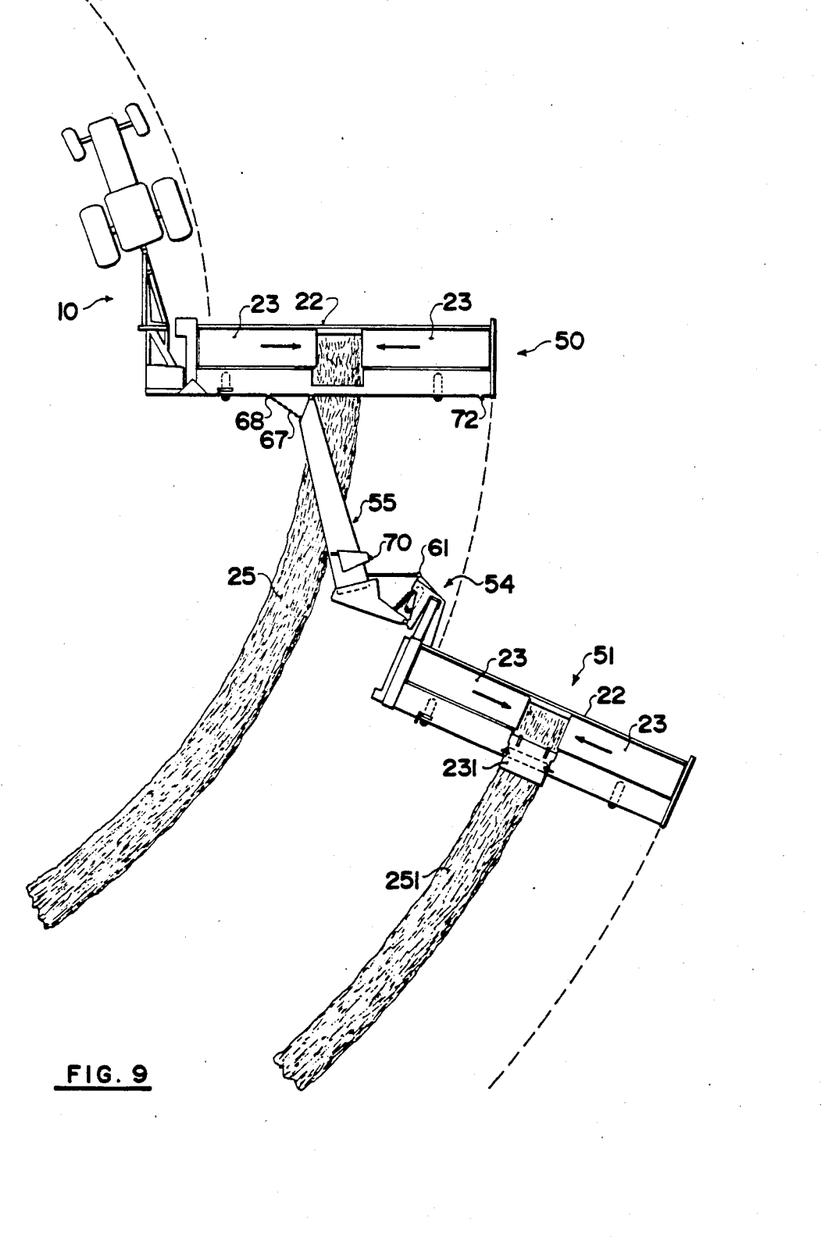
FIG. 9 is a schematic plan view of the swathers and hitch of FIG. 8 showing a steering movement of the duplex swather arrangement to the left.

It will be appreciated that should the front swather turn to the left as shown in FIG. 9, the distance between the connection point 68 of the chain 67 on the rear of the front swather and the end of the hitch 55 will reduce thus allowing the rod 64 to move rearwardly in the hitch 55 to allow the tension bar 61 to release the frame member 53 to move to the right under the bias from the spring 56. Thus, a change of angle of the hitch 55 relative to the front swather is detected by the chain 67 and communicated to the rear swather which moves through a similar change in angle to steer to the right. The result of the steering movements is shown in FIG.

9 and it will be seen that the rear swather then properly tracks the front swather to maintain the correct echelon relationship and to avoid twisting or sideways forces on the rear swather.

Figure 10:
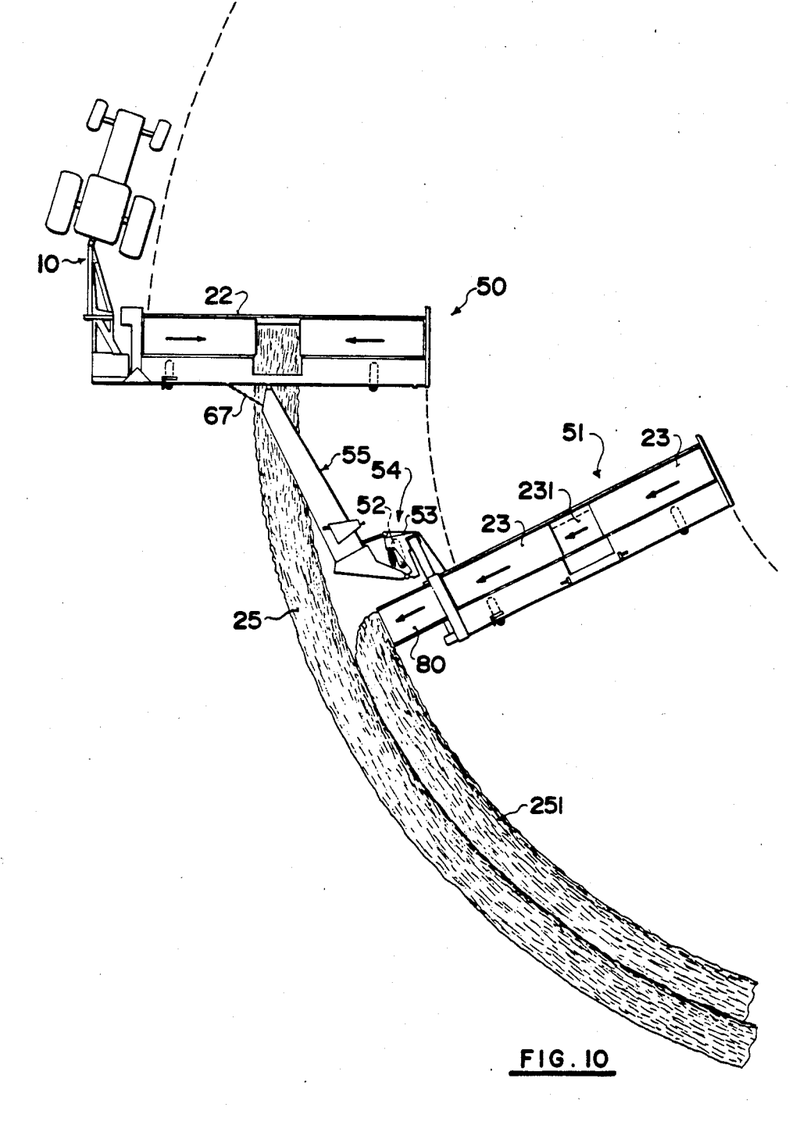
FIG. 10 is a plan view similar to that of FIG. 9 showing the duplex swather arrangement in a steering movement to the right.

Similarly, as shown in FIG. 10, as the front swather steers to the right, more chain 67 is drawn to accommodate the increase in angle between the hitch 55 and the rear of the front swather thus reducing the angle between the hitch and the rear swather so that the rear swather steers to the left as shown.

These steering movements provide a very highly manoeuverable duplex swather arrangement which can turn tight corners while avoiding excessive sideways forces and avoiding areas of crop remaining uncut. This manoeuverability allows the duplex swather to avoid obstacles by suitable steering movements controlled by the direction of the tractor.

Figure 11:
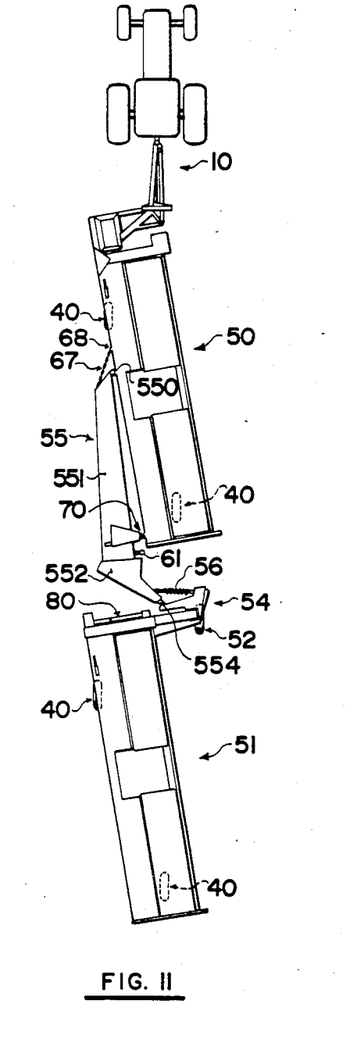
FIG. 11 is a plan view similar to that of FIGS. 9 and 10 showing the duplex swather arrangement in transport position.

Turning now to FIG. 11, movement of the swathers into the transport position can be achieved by unlocking the ground wheels as previously described and by adjusting the front hitch as previously described. The intermediate or duplex hitch is then turned as shown in FIG. 11 and is latched to the rear of the front swather by a latch 70 schematically indicated in the Figure and shown in more detail in FIG. 8.

The latch is operated by a lever 71, omitted from FIG. 8 for the sake of clarity, which is manually operated to move a latch finger to engage a suitable loop 72 provided at the rear of the front swather. Thus, the hitch 55 is locked into position extending substantially rearwardly of the front swather. It will be noted that the length of the front section 551 of the hitch 55 is chosen such that it extends substantially half the way along the front swather and terminates adjacent one end of the front swather whereby the rear section 552 extends around the end of the front swather to connect with the rear swather at the coupling 554 as previously described.

The spring 56 in this position is substantially fully extended and hence provides little force between the hitch 55 and the rear swather or in fact it can be disconnected.

The front wheel 52 of the rear swather is released to castor and therefore turns in the transport direction along with the wheels 40 as previously described. The release of the front wheel is obtained by a linkage generally indicated at 521 which is operated by raising of the swather by operation of the cylinder 541. Thus, the duplex swather arrangement takes up the transport position which is stable based upon the movement of the wheels 40 as previously described with the wheel 52 supporting the front edge of the hitch 55 and the front frame member 53 of the rear swather 51.

Turning again to FIGS. 9 and 10, the duplex swather can be used in alternative arrangements to provide four different swath arrangements. In the first arrangement shown in FIG. 9, the drapers 23 are arranged conventionally so that each of the two parts of the swather forms a separate swath 25 centrally of the drapers 23. In a second arrangement shown in FIG. 10, a pivotally mounted centre section 231 is arranged over the central opening of the rear swather 51 and an intermediate length conveyor 80 is positioned at the end of the rear swather 51 to transport the swath to a position adjacent the swath 25 from the first or front swather 50. Thus, the swath from the rear swather indicated at 251 lies immediately adjacent or side by side relative to the swath from the front swather 50.

In alternative arrangements (not shown) a long conveyor can be used in place of the conveyor 80 in order to deposit the swath 251 directly on top of the swath 25. In a yet further arrangement (not shown) a short conveyor is used in replacement of the conveyor 80 to place the swath 251 adjacent to but spaced from the swath 25. These swath arrangements can be selected as required by the farmer to accommodate the combine harvester or baling equipment which he proposes to use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A duplex pull-type farm implement arrangement comprising a first implement and a second implement, first hitch means for transmitting a driving force to said first implement, rigid second hitch means extending generally rearwardly from a rear end of the first implement to a forward end of the second implement and arranged to communicate said driving force from the first implement to the second implement, means for pivotally coupling a front end of the second hitch means to the first implement for pivotal movement about a substantially vertical axis, means for pivotally coupling a rear end of the second hitch means to the second implement for pivotal movement about a substantially vertical axis and steering means for controlling the pivotal movements about said axes whereby said second implement follows the first in echelon relationship in a working direction.

2. The invention according to claim 1 wherein said steering means comprises means for changing the angle between the second hitch means and the second implement in dependence upon changes in the angle between the first implement and the second hitch means.

3. The invention according to claim 1 wherein said steering means comprises linkage means for detecting changes in angle between the first implement and the second hitch means and for varying the angle between the second hitch means and the second implement in a direction opposite to said detected changes whereby said second implement is steered in opposite direction to the first.

4. The invention according to claim 3 wherein said steering means includes means for biasing said second implement relative to the second hitch means so as to tend to steer said second implement in one direction, said linkage means acting to pull said second implement relative to the second hitch means against said bias to cause steering movement in the opposite direction.

5. The invention according to claim 4 wherein the linkage means includes a flexible element coupled between the hitch means and a position on the first implement spaced from the pivotal coupling between said first implement and the second hitch means.

6. The invention according to claim 1 wherein the second implement includes a front wheel and means mounting the wheel for castoring movement on the second implement adjacent the pivotal coupling between the second hitch means and the second implement.

7. The invention according to claim 1 wherein said steering means is arranged to be released and wherein said second hitch is arranged to be pivoted substantially through 90° relative to said first implement to a transport position and substantially through 90° relative to said second implement to a transport position in which said implements are moved in a direction substantially at right angles to the working direction.

8. The invention according to claim 7 including latch means for latching said second hitch means to said first implement in said transport position.

9. A duplex pull-type farm implement arrangement comprising a first implement and a second implement, first hitch means for transmitting a driving force to said first implement, rigid second hitch means extending generally rearwardly from a rear end of the first implement to a forward end of the second implement and arranged to communicate said driving force from the first implement to the second implement, means for pivotally coupling a front end of the second hitch means to the first implement for pivotal movement about a substantially vertical axis, means for pivotally coupling a rear end of the second hitch means to the second implement for pivotal movement about a substantially vertical axis and steering means for controlling the pivotal movement about said axes whereby said second implement follows the first in echelon relationship in a working direction, said steering means comprising means for biasing said second implement relative to the second hitch means so as to tend to steer said second implement in one direction and linkage means for detecting changes in angle between the first implement and the second hitch means and for pulling said second implement relative to the second hitch means against said bias to cause steering movement of said second implement in a direction opposite to said detected changes whereby said second implement is steered in a direction opposite the first.

10. The invention according to claim 9 wherein the linkage means includes a flexible element coupled between the hitch means and a position on the first implement spaced from the pivotal coupling between said first implement and the second hitch means.

* * * * *